(12) United States Patent
Krivopaltsev

(10) Patent No.: US 8,863,107 B2
(45) Date of Patent: Oct. 14, 2014

(54) WORKFLOW-BASED USER INTERFACE SYSTEM FOR MOBILE DEVICES MANAGEMENT

(75) Inventor: Eugene Krivopaltsev, San Jose, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 1171 days.

(21) Appl. No.: 12/188,977

(22) Filed: Aug. 8, 2008

(65) Prior Publication Data
US 2009/0044185 A1 Feb. 12, 2009

Related U.S. Application Data

(60) Provisional application No. 60/964,180, filed on Aug. 8, 2007, provisional application No. 60/964,131, filed on Aug. 8, 2007.

(51) Int. Cl.
*G06F 9/44* (2006.01)
*H04L 29/06* (2006.01)

(52) U.S. Cl.
CPC ..................... *H04L 29/06* (2013.01)
USPC ............................ 717/168; 717/173; 717/174

(58) Field of Classification Search
USPC ................... 717/168, 173–174, 132
See application file for complete search history.

(56) References Cited

U.S. PATENT DOCUMENTS

| | | | |
|---|---|---|---|
| 2002/0138543 A1* | 9/2002 | Teng et al. | 709/102 |
| 2006/0074730 A1* | 4/2006 | Shukla et al. | 705/8 |
| 2008/0040191 A1* | 2/2008 | Chakravarty et al. | 705/9 |
| 2008/0070495 A1* | 3/2008 | Stricklen et al. | 455/3.01 |

OTHER PUBLICATIONS

JIRA, JIRA User's Guide, 2002-2005,JIRA, ,http://www.atlassian.com/software/jira/docs/v3.13/jira-manual-user.pdf, p. 1-143.*
JIRA, JIRA Administratorr's Guide, 2002-2005,JIRA, ,http://www.atlassian.com/software/jira/docs/v3.13/jira-manual-config.pdf, p. 1-340.*
Business Wire, "InnoPath Announces Release of iMDM Solutions Suites Version 5.1", Sep. 16, 2006, TMCNet Robotics Wire, http://robotics.tmcnet.com//news/2006/09/12/1880016.htm, p. 1-3.*
Manolescu, "Micro-Workflow: A Workflow Architecture Supporting Compositional Object-Oriented Software Development", 11/11/200,p. 1-205.*
Blabbeek, "Query Nets: Interacting Workflow Modules that Ensure Global Termination ", Jun. 2003, p. 1-16.*

* cited by examiner

*Primary Examiner* — Li B Zhen
*Assistant Examiner* — Duy Khuong Nguyen
(74) *Attorney, Agent, or Firm* — Gregory & Sawrie LLP

(57) ABSTRACT

Embodiments of a workflow-based user interface for defining and managing functions implemented on mobile devices are described. A method under an embodiment utilizes a workflow-based mobile device management user interface. The method utilizes a pluggable workflow framework to achieve mobile device management externalization. The mobile device management platform is required to implement a set of basic action blocks that are used as primitives for further management policy composition. The method provides a development environment integrated with a mobile device management platform that allows assembling management (monitoring) primitives into meaningful management policies without changes to a core management platform infrastructure. The method claims addition of new primitives deployed as add-on products to enable new and advanced management policies, best integration practices with a carrier operational support system. The method enables debugging and tracing mobile device management policies in real time to minimize development and testing efforts.

20 Claims, 12 Drawing Sheets

| ITEM | DESCRIPTION |
|---|---|
| Device models | Device models are collections of information about the attributes, properties, and capabilities of subsets of devices with a specific make and model. |
| Device profiles | Device profiles are collections of information about the attributes, properties, and capabilities of subsets of devices with a specific make and model. For example, different firmware versions might change the capabilities of the device model. |
| Device Description Frameworks (DDFs) | Device Description Frameworks (DDFs) imported from DDF files describe the structures of the OMA DM management trees on the device models. |
| Aliases | Aliases are arbitrary names that you define. They can be used to provide default values for settings, correct values for updating devices based on diagnostics, and names that are simpler and easier to read the object URIs. |
| URI-alias mappings | URI-alias mappings establish correspondences between aliases and URIs, for a specific DDF file. These mappings allow the console to display more easily understood names for objects, provide a place in which default values can be defined, and permit specification of how dynamic node names will be determined. |
| Application definitions | Application definitions are used for management of OMA DM applications. Application definitions specify a set of aliases that are needed for an application, for example, to configure or diagnose the application. |
| Application profiles | Application profiles are used for management of OMA DM applications. Application profiles belong to a specific application definition. They provide values for the aliases specified in the parent application definition, or identify how the value can be obtained by reference to another application profile or to an alias. |
| Access points | Access points are used for configuration of legacy applications (that is, applications that are managed with protocols that are older than the OMA DM protocol, for example, Smart Messaging or OMA Client Provisioning). An access point allows a mobile device to gain access to the Communications Service Provider's network. |
| Proxies | Proxies are used for configuration of legacy applications. A proxy is a server that manages access points. |
| Proxy groups | Proxy groups are used for configuration of legacy applications. A proxy group is an ordered list of proxies, along with associated information, such as authentication and port information that applies to all proxies in the group. Instead of specifying a proxy in a settings template, you can specify a proxy group. When a proxy group is used, the MDM Carrier Suite uses the first accessible proxy in the group. |
| Settings templates | Settings templates are used for configuration of legacy applications. A settings template specifies application-specific and generic settings that apply to many device models. |

300 FIG.3

WORKFLOW-BASED USER INTERFACE SYSTEM FOR MOBILE DEVICES MANAGEMENT

CROSS-REFERENCE TO RELATED APPLICATIONS

This application claims priority from U.S. Provisional Patent Application No. 60/964,180, entitled "Integrated Mobile Device Management," filed Aug. 8, 2007, which is incorporated by reference in its entirety herein, and from U.S. Provisional Patent Application No. 60/964,131, entitled "Managing and Enforcing Policies on Mobile Devices", filed Aug. 8, 2007, which is incorporated by reference in its entirety herein.

TECHNICAL FIELD

Embodiments are described relating to telecommunication devices, and more specifically to user interface systems for configuring and managing mobile client devices.

BACKGROUND

The basic functionality of a typical mobile phone has gone through dramatic changes from being solely voice oriented to being capable to support complex features and rich data intensive applications. It is expected that this trend of increased complexity and capability of mobile devices will continue and drive significant increases in product and service innovation. In many respects, mobile device management is quite similar to a classic enterprise management. It includes provisioning, which is the ability to setup a new device or service for a mobile subscriber, firmware and software lifecycle management, which includes the delivery, configuration and retirement of new or updated programs and data, remote diagnostics of phone features, software and network connectivity, asset management, reporting and other features. To ensure ease of use, a combination of intelligent management, proactive monitoring and diagnostics is a necessity for wireless/mobile operators.

Present system, network, and enterprise management solutions are typically based on a protocol which defines two key items, a PDU (protocol data unit), which describes the content that is passed between a managed object and its manager, and a data model that uniquely describes the location and structure of managed objects. For mobile devices, the preeminent standard is OMA DM (the Open Mobile Alliance's Device Management) standard. A carrier typically one more instances of an MDM platform to manage associated mobile devices. The OMA DM protocol leverages the popular browser-client web-server interaction model and HTTP transport. Interactions between the management platform and device may be initiated by either the server (management platform) or the client (mobile device). A client initiated interaction follows the familiar paradigm of a web browser initiating a session with a web server. When the server wishes to initiate an interaction, it must start by notifying the client so that the client can once again initiate a browser-like session with the server. This server-to-client notification is carried via an SMS (short message service) communications channel text message that is specially recognized by the mobile device and routed to the OMA DM client software so that it may establish a session with the server. Once the SMS-based notification is received, a client-to-server session is established and proceeds in the same manner as for a client initiated interaction.

In general, a mobile device management platform is a complex software product that provides device management firmware update, device configuration and remote diagnostics management. The platform keeps track of all managed devices, provides a device modeling framework, contains specific metadata that describe firmware packages, applications, diagnostic policies and other artifacts to facilitate comprehensive mobile device management. As mobile device technology advances, there is a constant drive to provide and improve basic mobile device management functions, such as diagnostics, remote configuration and provisioning, security, backup/restore, network usage and support, device provisioning, policy applications, logging and monitoring, and remote control and administration, and any other similar functions. Such functions are typically delivered as configuration modules through FOTA (firmware over the air) updates. Presently these functions are implemented using traditional programming languages, such as Java, C, C++, and so on. This approach has multiple limitations primarily related to specific customer and equipment constraints and requirements. Some of the requirements are not known in advance because they are specific to new equipment, revised management policies based on local operational environment, and other similar reasons. In order to satisfy new monitoring and management requirements, there is a need for a mobile device management provider to create custom patches. In many cases, these are essentially equivalent to deeply customized project versions. This can have a significant negative impact in terms of time, resources, and maintenance efforts. Moreover, the user typically has minimal ability to significantly change management policies without upgrading the core software within the mobile device.

While the goals of various carriers regarding mobile device management are similar, their specific needs can be quite varied. Needs can vary based on local law or custom, the surrounding systems that must be integrated and the desire for distinct service offerings. A few of the major challenges for MDM platform providers and their customers are described. First, a carrier shall be able to change a management task to include an interaction with a subscriber and MDM, based on equipment capabilities, legal, security and other factors. Carrier requirements may evolve over time and create a need to refine/change management policies over time. Second, because mobile device management is not an isolated service, it must be integrated with other carrier services such as billing, accounting, troubleticketing, asset management. However integration requirements are often very specific. Third, a carrier is always looking to extend existing applications to include new features like software management, auto-provisioning, asset management or other new applications. Fourth, carrier requirements may evolve over time. Customized features typically become available as a part of a new release or patch from third party. This has multiple drawbacks, in that the carrier does not do it itself, the release cycle can be lengthy, resource consuming and therefore expensive, and release multiplication can lead to maintenance problems, especially when new common patches should be applied over all previously customized releases. Fifth, in many cases management application development does not start from a scratch. Ideally a management application developed by MDM provider should be open for a carrier inspection and customization without a need to involve an original software vendor. Existing management algorithms could be used as macro building blocks to compose new services. Sixth, MDM providers strive to bring reliability and stability to a management platform. There are multiple reasons in pursuing these goals, however, an extensive customization, based on "tail to fit" is a main drawback for a stable and reliable platform. Finally, migration is a key procedure that eases process of bringing data and intelligence from previous product releases to a latest one.

What is needed, therefore, is the ability to program complex business and management policies using simple user interface (UI) forms or natural languages in a work-flow based model that is efficient and that provides the benefits of externalization, flexibility, and simplicity.

BRIEF DESCRIPTION OF THE DRAWINGS

Embodiments of the present invention are illustrated by way of example and not limitation in the figures of the accompanying drawings, in which like references indicate similar elements and in which:

FIG. 3 is a table that outlines and describes information in the configuration library, under an embodiment.

DETAILED DESCRIPTION

Figure 1:
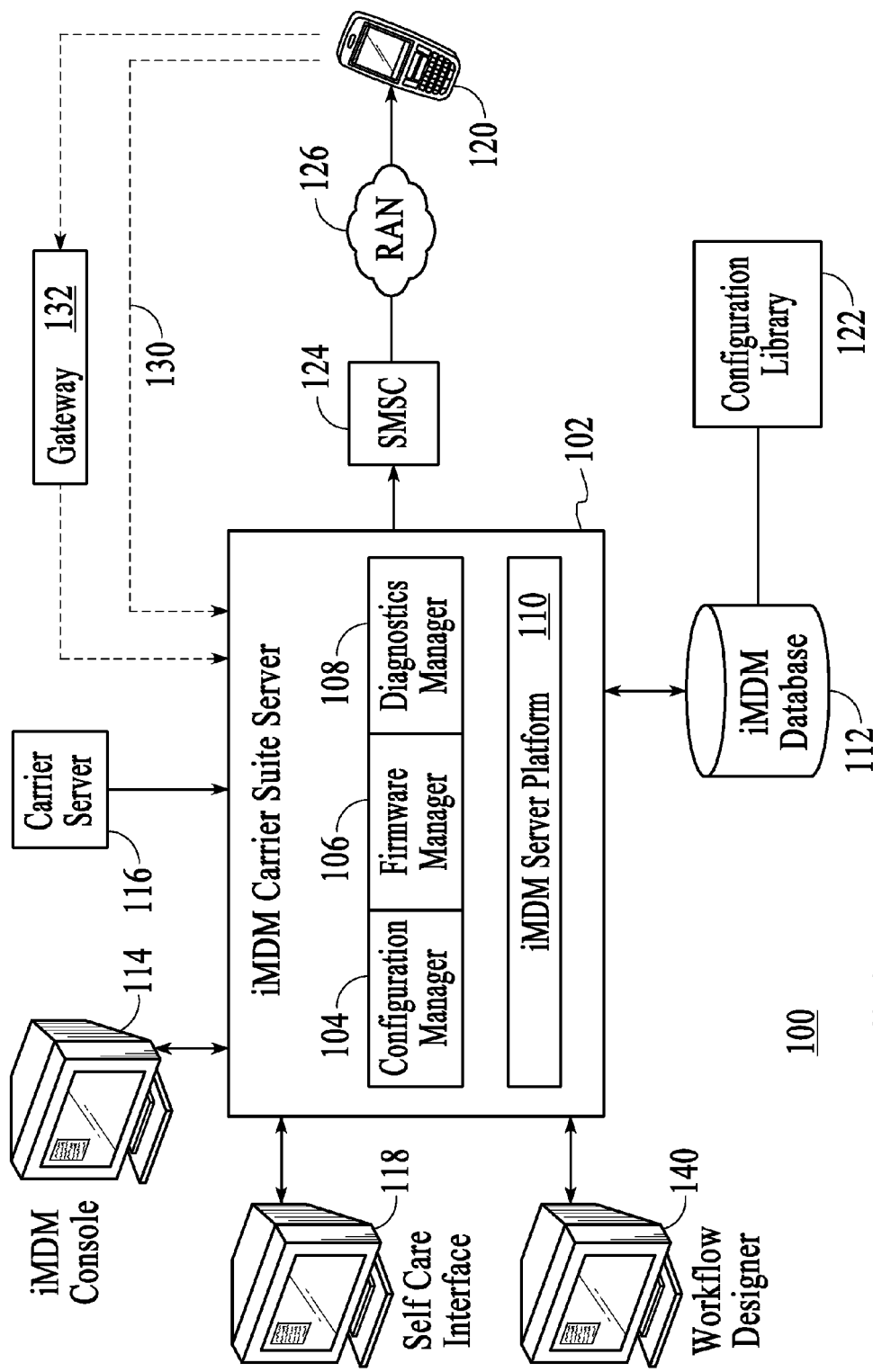
FIG. 1 illustrates a computer network system including a carrier suite server computer that implements one or more embodiments of a workflow designer system, under an embodiment.

Embodiments of the invention as described herein provide a solution to the problems of conventional methods as stated above. Embodiments of a workflow-based user interface for defining and managing functions implemented on mobile devices are described. A method under an embodiment utilizes a workflow-based mobile device management user interface. The method utilizes a pluggable workflow framework to achieve mobile device management externalization. The mobile device management platform is required to implement a set of basic action blocks that are used as primitives for further management policy composition. The method provides a development environment integrated with a mobile device management platform that allows assembling management (monitoring) primitives into meaningful management policies without changes to a core management platform infrastructure. The method claims addition of new primitives deployed in real time as add-on products to enable new and advanced management policies, best integration practices with a carrier operational support system. The method enables debugging and tracing mobile device management policies in real time to minimize development and testing efforts.

In the following description, various examples are given for illustration, but none are intended to be limiting. The embodiments described herein provide a method and apparatus for implementing a workflow-based user interface and system for managing mobile devices over a network.

In one embodiment, a mobile device management system incorporates a workflow designer interactive design tool enables system designers and integrator to specify sequences of device management actions in a single logical workflow. The workflow designer essentially functions like a white board, allowing designers to manipulate graphical elements and symbolically depict the flow of management actions. Workflows are functional templates used to direct management of targeted entities, such as wireless devices and Operation Support Systems (OSS). In one embodiment, the workflow designer is a distributed, client-based application that contains two graphical user interface-based modules: a workflow designer component that creates and manages workflows, and a workflow monitor component that monitors and troubleshoots workflows.

In one embodiment, the workflow designer application is connected through a network to a server-based device management system (e.g., an MDM carrier suite) that is part of a wireless operator's OTA (over the air) system. The carrier suite stores created workflows; makes workflows available to the workflow designer application; uses workflows to direct management tasks invoked by users and provides interfaces to customer support representatives. The workflow designer application users can monitor instance processing of the workflow using the workflow monitor, in order to modify or troubleshoot the related workflow.

Aspects of the one or more embodiments described herein may be implemented on one or more computers executing software instructions. The computers may be networked in a client-server arrangement or similar distributed computer network. In one embodiment, the workflow application designer is embodied as a client-based workflow designer application that is installed on a user's local client machine. This client-side application works together with a server-based device management system (e.g., an MDM carrier suite) that stores created workflows, and uses workflows to manage targeted entities (e.g., mobile devices).

Mobile Device Management Server

In one embodiment, a workflow design system is implemented in an MDM carrier suite that allows subscribers, customer care representatives and system administrators to perform a wide range of mobile device management tasks. The carrier suite is configured to perform management tasks with minimal user involvement based on defined rules, without direct involvement of administrative personnel.

FIG. 1 illustrates a computer network system including a carrier suite server computer that implements one or more embodiments of a workflow designer system, under an embodiment. For the embodiment of FIG. 1, an MDM carrier suite server 102 ("MDM server") is coupled to a plurality of workstation client computers and remote or mobile client computers over a variety of network connections. The MDM server 102 has a set of carrier suite applications including a configuration manager 104, a firmware manager 106, and a diagnostics manager 108. These applications perform management tasks for applications and functionality provided on the mobile device 120.

The configuration manager 104 sets and manages the parameters that are required to be configured on the mobile device 120. Typically, in order to use voice and data networks, a large number of parameters must be set on the mobile device. Some are set at the factory, but many are not in order to enable configuration in the field to accommodate new features, applications, and so on. The configuration manager facilitates a simple and reliable way to configure a mobile device managed service, and represents a significant improvement over present manual method, such as WAP, email, and MMS, which are difficult and error-prone. The configuration settings are based on underlying OMA protocol and utilize a management object configuration that corresponds to set of properties in a device management tree. To abstract an "application" configuration from an individual make/model a virtual configuration property is associated with a device property defined within DDF (device description framework) files. Configuration settings could be reviewed, stored and distributed for an individual device or a group of devices. The configuration manager allows setting or resetting of both fixed and dynamic settings using over-the-air (OTA) mechanisms.

The firmware manager 106 implements a FOTA process (firmware over the air) to update firmware consisting of operating system (OS) components, drivers, patches, and other software components that are essential to operation of the mobile device. The FOTA process which is based on standard mobile device protocols such as OMA DM, OMA DLOTA (Download Over the Air) and FUMO (Firmware Update Management Object). In one embodiment, the management platform of the MDM server 102 has a repository of update packages store in a data store, such as database 112, that are specially constructed to minimize number of bits transferred over the air and to optimize flash block writes. The FOTA process can be client or server-initiated. A server-initiated FOTA request targets a single device (e.g., mobile device 120) or multiple devices in a bulk request. In some cases updating a mobile device to the latest firmware version requires multiple incremental updates (multi-step upgrade). The core management platform logs all update steps and is capable in generating detailed reports.

The diagnostic manager 108 performs the tasks of querying, diagnosing and fixing problems related to mobile device operation remotely and in real-time. Such problems can include hardware faults (e.g., bad battery, failed transceiver, keypad, or display, etc.), or firmware or network faults (e.g., bad driver or OS module, etc.). In general, increased device complexity requires effective ways to diagnose, detect, and repair managed mobile devices. Present manual diagnostics methods generally take a long time and require expertise and expense. The diagnostic manager 108 implements automatic diagnostic mechanisms to provide mobile device self-diagnostic functionality and therefore provides proactive management of the device.

As shown in FIG. 1, an MDM console 114 acts as an interface to the MDM server 102 for administrative and customer care tasks. Servers in the carrier network 116 can interface to the MDM server 102 through suitable APIs (application program interfaces). Such servers can include network elements that detect new mobile devices on the network or that provide some level of customer care tasks. A self-care server 118 can also be included to permit users to configure their own mobile devices.

A data store 112 coupled to the MDM server 102 stores data about mobile devices, as well as information about device models and information that the server needs to configure and manage these devices. A configuration library 122 within the MDM database stores diverse information about device modules and applications that are managed over the air. The MDM carrier suite organizes the required information so that administrators can define a large amount of information one time, and change it if necessary so that support personnel need to provide only a minimal amount of information. The configuration library 122 encompasses all of the information in the MDM carrier suite that is needed to manage the configuration of applications on mobile devices.

The MDM carrier suite includes processes that may represent one or more executable programs modules that are stored within the server 102 and executed locally within the server. Alternatively, however, it may be stored on a remote storage or processing device coupled to server accessed by the server to be locally executed. In a further alternative embodiment, the process may be implemented in a plurality of different program modules, each of which may be executed by two or more distributed server computers coupled to each other over a network.

For the embodiment shown in FIG. 1, the mobile device 122 comprises a mobile phone (e.g., a smartphone) that is coupled to the MDM server 102 over one or more wireless networks. Communication between the MDM server and mobile device is accomplished via SMS (short message service) messages, or a similar message protocol. For this embodiment, the push path for configuration messages and notifications is from the MDM server 102 to a Short Message Service Center (SMSC) 124 and through a radio access network (RAN) 126 to the mobile device 120. SMSC 124 is a network element in the mobile telephone network that delivers SMS messages.

In one embodiment, the mobile device 120 is an OMA-enabled client device. In this case, it uses the OMA DM protocol to communicate with the MDM server 102, and one or more return paths from the mobile device to the server are available. If the mobile device supports HTTP (hypertext transport protocol), it can communicate directly with the server over link 130. If it does not support HTTP, the mobile device communicates with the server through a WAP (wireless application protocol) gateway 132.

In one embodiment, a standard management protocol, such as OMA DM (Open Mobile Alliance Device Management), is used by the server to establish the configuration properties of the mobile client 102. In general, the OMA DM specification is designed for management of small mobile devices such as cell phones, PDAs and palm top computers. The device management function is intended to support the following typical uses: provisioning including configuration of the device, enabling and disabling features; providing software upgrades, performing fault management, and the other similar functions.

The configuration of the mobile device, including any relevant operating characteristics is represented and stored using the OMA DM device management tree structure. For OMA DM applications on a mobile device, configuration is handled by setting the values of objects in the OMA DM management tree for the device. Certain OMA DM applications may be predefined, such as bootstrap routines, diagnostics, and other applications. The OMA DM uses XML (eXtensible Markup Language) for data exchange. Device management of mobile clients takes place by communication between the MDM server 102 (which is managing the device) and the mobile client 102. OMA DM is designed to support and utilize any number of data transports such as, physically over both wireline (e.g., USB, RS-232) and wireless media (e.g., GSM, CDMA, IrDA or Bluetooth). The transport layers may be implemented over WAP (wireless application protocol), WSP (wireless session protocol), HTTP (hypertext transport protocol), OBEX (object exchange), or similar transport protocols. In one embodiment, the communication is initiated by the MDM server 102, is asynchronous using any applicable available method, such as a WAP Push or SMS (short message service). The initial message from server to client is said to be in the form of a notification, or alert message. Once the communication is established between the server 102 and client 120, a sequence of messages might be exchanged to complete a given device management task. The OMA DM protocol specifies exchange of packages during a session, each package consisting of several messages and each message in turn consisting of one or more commands. The server 102 initiates the commands and the mobile client 120 is expected to execute the commands and return the result via a reply message.

MDM Managed Client

The client device 120 is typically a mobile client device that executes a number of different application programs that provide various functions or utilities, such as communication, entertainment, navigation, information management, and basic computing functions. Mobile client 120 may be a cell phone, smartphone, or any mobile communication device that provides access to the network and has a sufficient degree of user input and processing capability to implement policies and execute tasks managed by the MDM server 102. In some computing environments, the client device may also be embodied in a standard mobile computing device, such as a notebook computer, personal digital assistant, game console, media playback unit, or similar computing device. Such client computers may be coupled to the server computer over a wired connection, a wireless connection or any combination thereof.

In one embodiment, the mobile device includes an intelligent management agent that communicates with the processing elements of the MDM carrier suite server 102. In one embodiment, a standard management protocol, such as OMA DM (Open Mobile Alliance Device Management), is used by the server retrieve, analyze and set management properties values for the mobile client.

Figure 12:
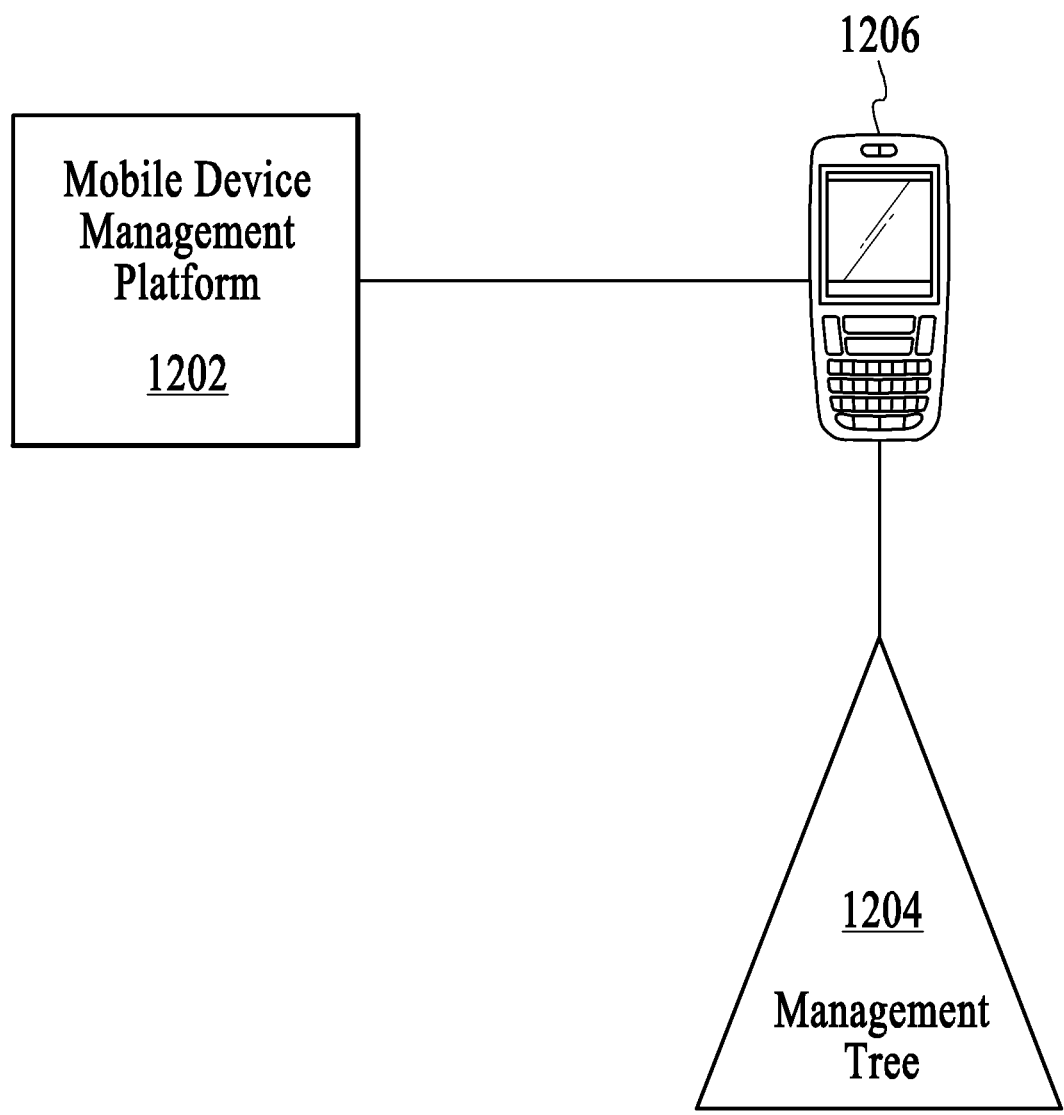
FIG. 12 illustrates a system for mobile device management between a MDM platform and an OMA DM enabled mobile device, under an embodiment.

FIG. 12 illustrates a system for mobile device management between a MDM platform and an OMA DM enabled mobile device, under an embodiment. Using the OMA DM protocol, the server 1202 can retrieve, analyze and set management property values stored in the management tree 1204 of mobile device 1206. The device management function is intended to support the following typical uses: provisioning including configuration of the device, enabling and disabling features; software upgrades, fault management, and the like. In one embodiment, the configuration manager 104 in the carrier suite of the MDM server 102 manages configuration settings on the mobile device over the wireless (cellular) network. For OMA DM applications, the carrier suite configures virtually any application on the mobile device for which configuration is handled by setting the values of objects in the OMA DM management tree. Certain OMA DM applications may be predefined, such as bootstrap routines, diagnostics, and other applications.

Figure 13:
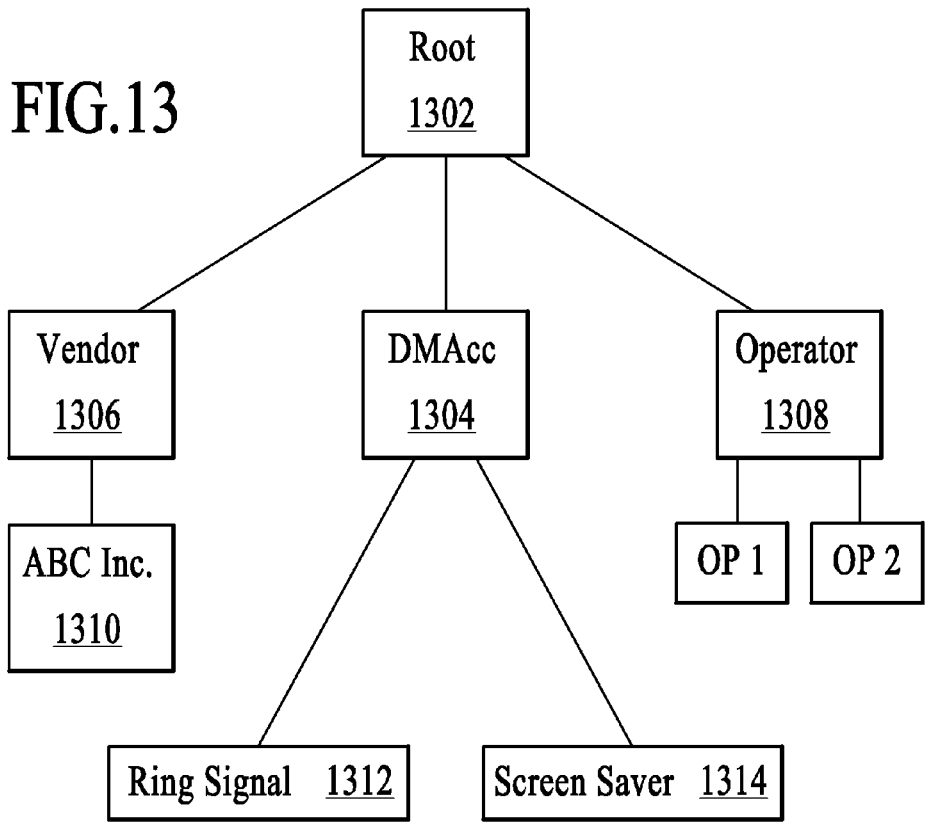
FIG. 13 illustrates an example OMADM management tree for a mobile client device, under an embodiment.

The management tree 1204 represents any type of configuration aspect of the mobile device and comprises a number of nodes storing operational parameters relating to relevant settings, functions, or the like. FIG. 13 illustrates an example OMADM management tree for a mobile client device, under an embodiment. The management tree includes a root node 1302 and a number of subnodes under this root node. These subnodes can include a DMAcc node 1304, a vendor node 1306, and an operator node 1308. Each node has an associated URI. For example, to access the "ABC Inc" node in the management tree of FIG. 13, the correct URI is "./DMAcc/ABCInc". The DMAcc node 1304 generally specifies the settings for the device management client in a managed device. Any number of functions, applications or relevant settings for the client can be specified by subnodes in the management tree. For the example of FIG. 13, subnodes are shown for the ring signal 1312 and screen saver 1314 settings of the mobile client. These and any other settings may be configured through firmware updates provided by the MDM server administrator, a carrier service administrator, or any other third party provider.

The management tree contains and organizes all the available management objects so that the server can access every node directly through a unique URI (uniform resource identifier). The management tree comprises a number of hierarchically organized nodes. An interior node can have an unlimited number of child nodes, while a leaf node must contain a value, including null. Each node has a set of run-time properties associated with it. All properties are only valid for the associated node. An access control list (ACL) dictates which server can manipulate that node. The manipulation includes adding a child node, getting the node's properties, replacing this node, or deleting this node, as well as other run-time properties. The management tree, or any subtree for the mobile device can be accessed via an OMA message invocation from the MDM server platform 1202.

In one embodiment, the mobile device policy management system includes mechanisms that augment node management properties. In general, the structure of management information defines a management node. The method augments set of standard management properties to include following set: status, refresh interval, state (enabled/disabled), and logging flag. In addition the management properties include minor actions, thresholds and simple rules, as well as major actions, thresholds and simple rules. The "status" property is equivalent to a perceived node severity, i.e., none, minor, or major. The "refresh" interval defines a period for a rule evaluation. The management state allows the system to suspend or resume node evaluation. The logging flag controls logging policy for a given node. A property group is repeated for each supported severity level. The "action" property presents an action that is fired if a simple rule is satisfied. The "threshold" presents a threshold value used as a rule parameter.

In one embodiment, the system defines mobile agent behavior which requires periodic monitoring for each active monitoring node in a device management tree. The process includes rule evaluation, logging, and executing corrective action. The mobile agent combines an execution of standard OMA messages sent by the MDM and permanent monitoring of active nodes.

Figure 14:
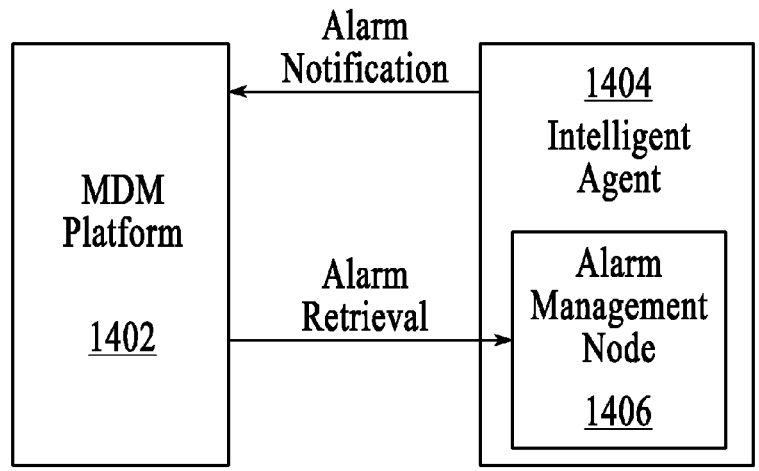
FIG. 14 is a block diagram that illustrates a system for providing alarm notification and alarm retrieval for an intelligent agent, under an embodiment.

The mobile agent process can also include a function for providing notation of alarms. For example, each time a simple rule is satisfied, an agent generates an alarm record that includes node URI, node value, severity timestamp and perceived severity. An agent trying to send alarm notifications to a server could retrieve all alarms using a dedicated management node. FIG. 14 is a block diagram that illustrates a system for providing alarm notification and alarm retrieval for an intelligent agent, under an embodiment. As shown in FIG. 14, the intelligent agent 1404 includes an alarm management node 1406. The agent communicates with MDM platform and provides alarm notifications to the platform and retrieves alarms from the platform in the alarm management node 1406.

In one embodiment, an intelligent agent provides a status aggregation for each sub-tree in a device management tree. This allows the server to get an overall device status without a need to query individual nodes.

The MDM server 102 can be used to store and distribute a monitoring configuration. Under this embodiment, a procedure defines a monitoring configuration that is based on a set of augmented node properties. The management server is used to create, store and distribute monitoring configurations.

Workflow Designer

As shown in FIG. 1, system 100 also includes a workflow designer component 140. The workflow designer may be embodied as a program (e.g., a Java application) executed on the MDM server 102 or a separate computer that is coupled to the MDM server over a TCP network. The workflow designer performs the general tasks of designing and monitoring (test) workflows, and allows for the customization of OTA operations to meet specific needs and to manage diverse device models. As such, the workflow designer is basically a tool that allows developers to design and implement custom workflows comprising sets of instructions to the MDM server that dictate how the server should perform OTA device management operations. Rather than requiring that an operation (e.g., firmware update or application configuration) is always performed the same way, workflows allow carriers to match details of the operation to business requirements, quickly provide services on new devices that may not adhere to specifications, or change the details of OTA management for different groups of subscribers, for example, to provide tiered services or enterprise features. Using the workflow designer 140, users control device management by specifying the logic and processing of device management operations.

Figure 2:
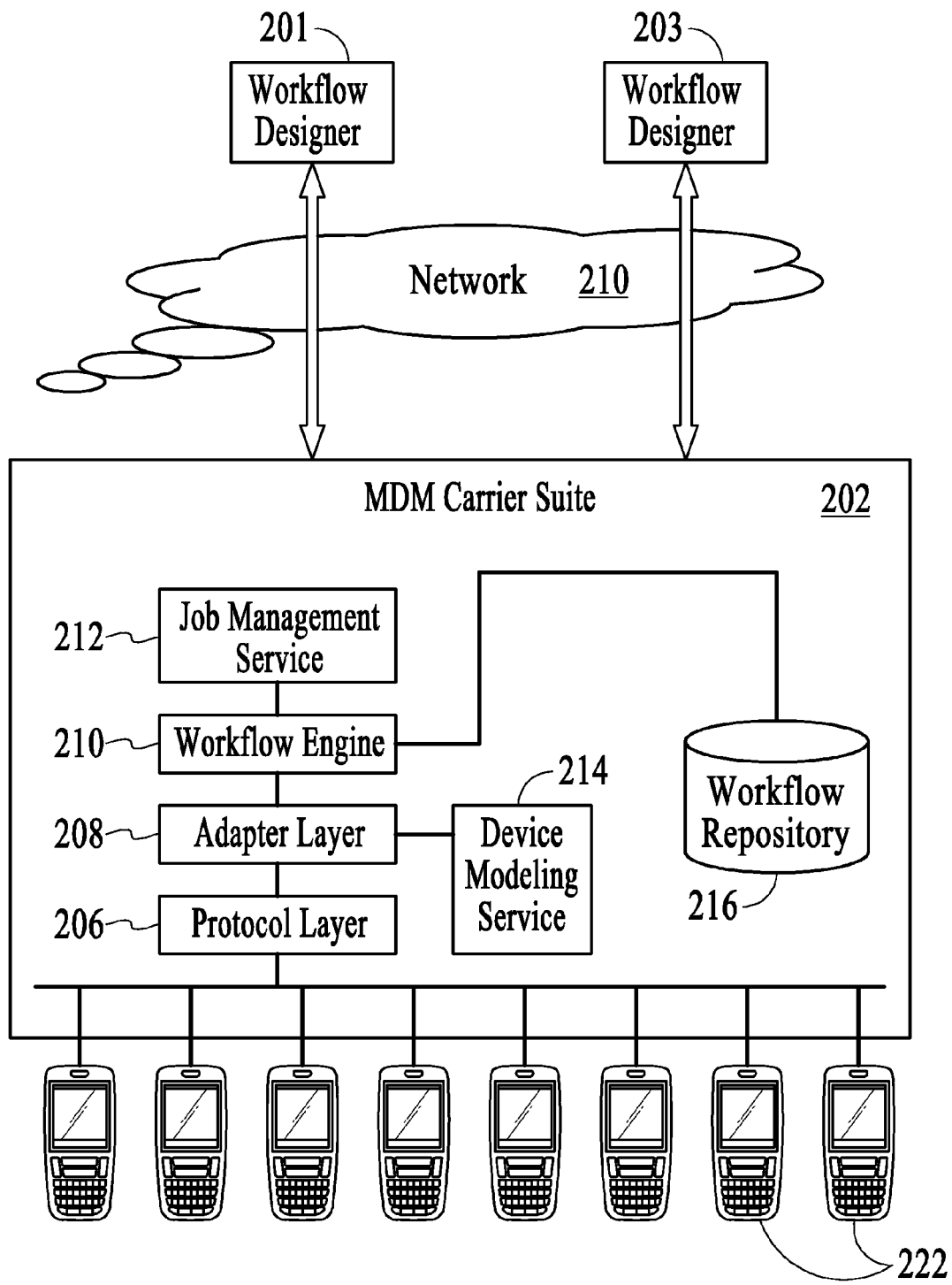
FIG. 2 illustrates a computer network system that implements one or more embodiments of a workflow-based mobile device management system.

FIG. 2 is a block diagram that illustrates a workflow designer framework, under an embodiment. As shown in FIG. 2, the workflow designer 210 obtains workflows from a workflow repository database 216 of the MDM server 202 and performs workflow management functions. One or more workflow designer applications 201 and 203 can have a single designer session running, and each MDM server can have multiple, concurrent designer sessions running. The workflow sessions are organized and managed by a job management service 212.

The MDM server is coupled to one or more mobile client devices 222. When a mobile device communicates with the MDM server 201 for device management, a protocol layer module 206 manages the communication traffic. A device modeling service 214 determines the context for the specific device and type of management task. An adapter layer 208 instantiates a workflow and passes control to the workflow engine 210, which processes the workflow instance. Throughout instance processing, the MDM server user does not need to be aware of the underlying workflow technology and interacts with management functions rather than with the workflows directly. Implementation of the workflow designer and the MDM carrier suite of the server leverages a workflow paradigm for the majority of device management tasks.

Individual workflows are assigned to a management category, can use parameters, can be cloned, and can be related to other workflows as a subroutine workflow. When created, workflows are assigned to as specific device management categories, depending on their intended purpose. The device management categories include configuration management, which specifies the configuration of application parameters on a device; firmware management, which specifies the upgrading of device firmware; a composite category which is a combination of two or more categories, or for a purpose not related to the other categories; and diagnostics management which configures diagnostics and event monitoring. The configuration management category utilizes the data stored in the configuration library 122 of FIG. 1. FIG. 3 is a table that outlines and describes information in the configuration library, under an embodiment.

Workflows are assigned to a particular category upon creation. Workflow parameters contain values used during workflow instance processing. In one embodiment, there are three types of parameters. These include category parameters, that are always present for all workflows in a given workflow category and have initial values that are assigned by the MDM server and in which a workflow instantiation populates all parameters defined for the workflow category; internal parameters, which are signed by an individual action block and used within a workflow instance; and external parameters that are declared as one the following types: Boolean, integer, double, string. During declaration, initial (default) values can be assigned. The workflow designer user can define additional parameters, not included in the workflow category, to be made available to a workflow instance. Each workflow definition may declare its own input parameters specific to that particular definition.

An existing workflow can only be changed when it is in the pending state. However, an existing workflow (in any state) can be used as the basis for a different workflow by using the process of cloning. Cloning a workflow involves saving an existing workflow with a different name. The cloned workflow is automatically assigned the pending state, which can then be changed.

Figure 4:
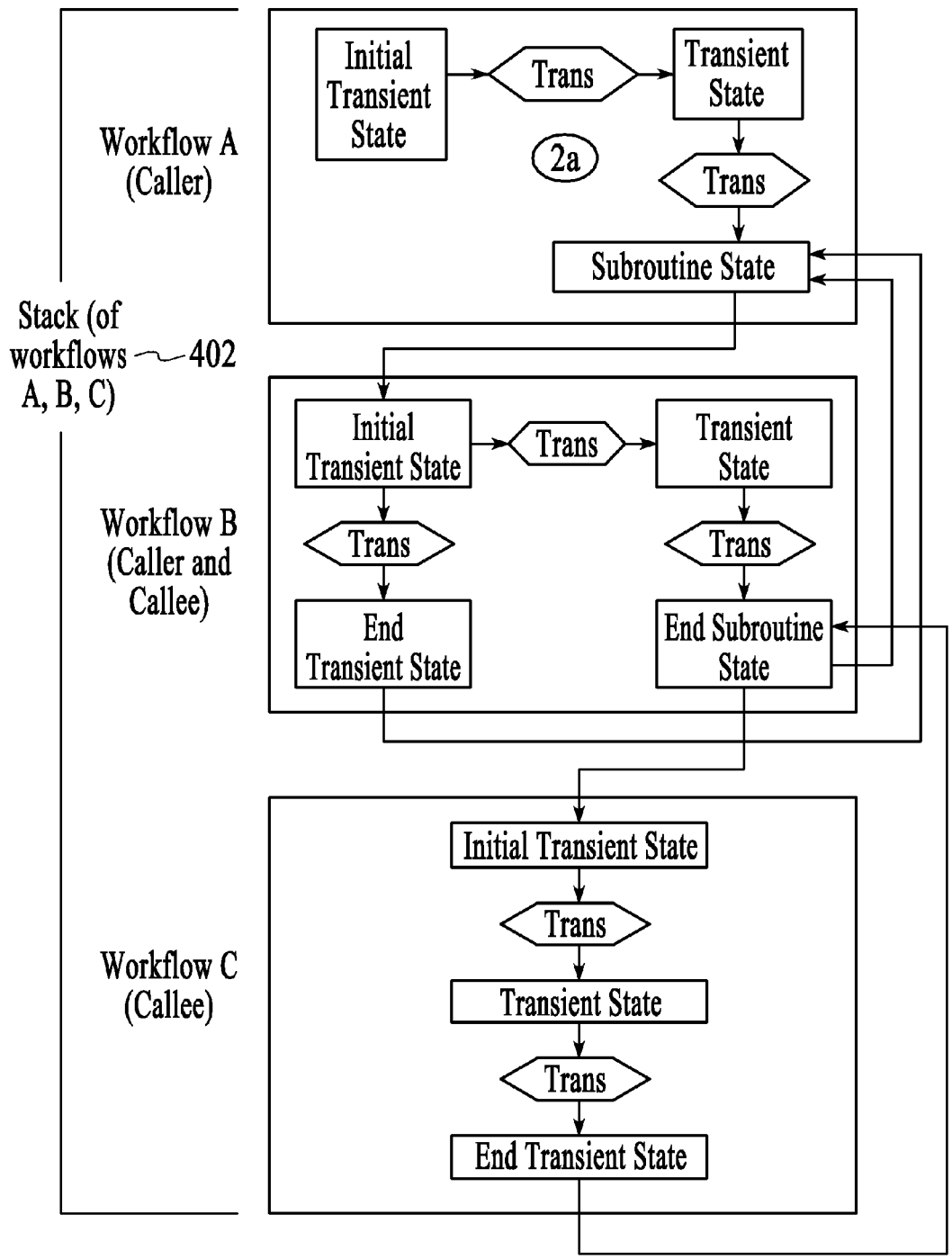
FIG. 4 illustrates a workflow stack logic flow for multiple workflows, under an embodiment.

In general, workflows are designed as modular processing units. Any workflow can call any other workflow as a subroutine, and instance processing is then transferred from the calling workflow (caller) to the called workflow (callee). FIG. 4 illustrates a workflow stack logic flow for multiple workflows, under an embodiment. The example of FIG. 4 includes three workflows denoted workflow A, workflow B, and workflow C. Each workflow includes a number of states connected by transitions. Certain states within a workflow can call one or more other workflows. Caller and callee workflows call one another in accordance with specific rules. First, all related caller and callee workflows are grouped in a stack, as shown by stack 402 of FIG. 4. Since caller and callee workflows share the same execution context, workflow parameters and objects are available to both caller and callee workflows. A subroutine state transfers processing to a specified callee workflow. A workflow can have any number of subroutine states, and when called, instance processing is transferred to the initial state in the callee workflow. When the callee instance processing reaches an end state (a state that does not have any transitions going from the state), instance processing is transferred back to the subroutine state in the caller workflow. Any workflow can have any number of end states, for example, workflow B in FIG. 4 has two end states. When the end state in a callee workflow returns processing to a subroutine state that is also an end state, processing is then returned to the subroutine state in the original caller workflow. When instance processing of the highest workflow in a stack reaches an end state, all instance processing stops.

As mentioned above, a workflow is made up of specific components, including process state, which is a point in a workflow that can be referenced (instance processing can lead to a given state); and a transition, which is a logical path leading from one process state to another state. Each transition is made up of one logical condition, and one or more action blocks in a specific sequence. During instance processing if the condition is satisfied, all action blocks are applied to the targeted entity, in sequence. If the condition is not satisfied, no action blocks are applied.

Figure 5:
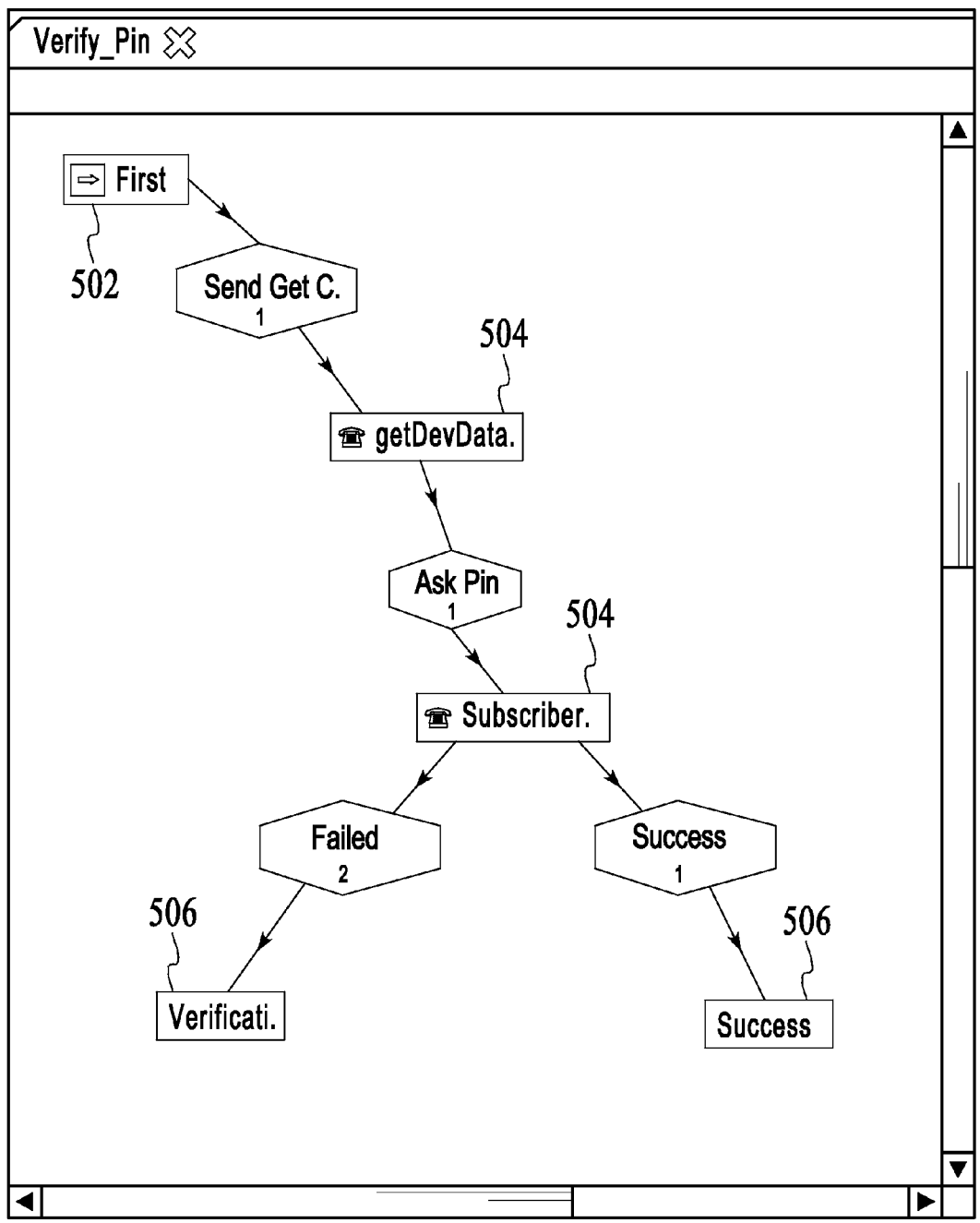
FIG. 5 illustrates an example workflow presented in a user interface and including a number of process states and transitions, under an embodiment.

FIG. 5 illustrates an example workflow presented in a user interface and including a number of process states and transitions, under an embodiment. In the example of FIG. 5, process states are indicated by rectangles, and represent a functional or operational state that instance processing of the workflow can reach. Each process state can have any number of transitions (including none) leading to and going from the state. Each process state is categorized as a specified type of either a transient state, DM terminal state, or a subroutine state. A transient state (no icon) is a state where instance process immediately proceeds to the first transition going from the state. Initial states can be either transient states or subroutine states. A DM terminal state, illustrated in FIG. 5 as a telephone icon 504, is a device/subscriber query state. When a workflow instance processing reaches a DM terminal state, the DM terminal state executes the query commands specified by a transition preceding the state and instance processing is suspended while waiting for the query response. After a response is received, the DM terminal state processes the response. The instance processing resumes with the processing of transitions going from the DM terminal state that typically evaluate the query response to determine subsequent actions. A subroutine state, icon 506, is a gateway to a subroutine workflow. When the workflow instance processing of a caller workflow reaches a subroutine process state instance processing is transferred to the initial state in the specified subroutine (callee) workflow. When the subroutine workflow instance processing reaches an end state, the subroutine workflow instance processing is returned to the subroutine state in the caller workflow. Transitions going from the subroutine state are then processed, in order.

Process states can be assigned the attributes of an initial state, a persistent state, or an end state. An initial state (e.g., right-arrow icon 502) is the beginning state for a workflow. Every workflow must have one and only one initial process state, and workflow instance processing starts at the initial state, however, instance processing can restart at a persistent state. When a subroutine workflow is called, instance processing begins at the initial state in the subroutine. A persistent state (which may be displayed as a floppy disk icon) represents the ability to resume instance processing from the point of stoppage. Although persistence is applied to a process state, persistence controls workflow instance processing. Workflow instance processing can be resumed from the point of stoppage when and only when processing stops at a persistent state. Persistence is typically applied to one or more states in a workflow when instance processing by the same local computer is likely to be interrupted, such as when waiting for a device query response that may take some time. Persistence is typically used when instance processing could be re-assigned to another node of an MDM cluster An end state is any state that does not have any transitions going from the state. Any process state can attain the end state attribute by its position in a workflow. When instance processing reaches an end state in a callee workflow, instance processing is transferred to the subroutine state in the caller workflow that called the subroutine workflow. When workflow instance processing reaches an end state in the highest (parent) workflow in a stack, all instance processing stops. Upon return to an end state that is a subroutine state, if the end subroutine state was called by a workflow, instance processing is transferred to the calling workflow, and if the end subroutine state is in the highest workflow in the stack, all instance processing is stopped.

In addition, process states can be assigned one of six severity levels. These are denoted: normal, warning, minor, major, critical, or fatal. The meaning of each severity level is user-defined. The severity level of a workflow instance is the severity of the state currently being processed. Instance severity can be changed during the processing of an instance. Workflow monitoring filtering can be based on severity levels. The workflow instances that are displayed at any point in time are governed by the current instance severity level. Thus, severity filtering can be used to display workflow instances that are encountering difficulties.

Transitions are paths that workflow instance processing can take to go from one process state to another process state. Transitions are made up of two components: a logical condition made up of one or more logical elements, and one or more processing action blocks.

When a transition is processed, its condition is first analyzed to determine whether the condition is satisfied or not. If the condition is satisfied, the specified action blocks are applied to the targeted entity. If the processing of the target is not successful, an error is returned, and instance processing is stopped.

Workflow transitions adhere to a number of defined rules. Each transition contains one condition (a related set of one or more logical elements), which produces a Boolean result (satisfied or not satisfied). If more than one condition is desired to advance from one state to another state, more than one transition between the states must be used. Initial states do not have transitions leading to the state and can have any number of transitions going from the state. End states do not have transitions going from the state and can have any number of transitions leading to the state. Process states other than initial and end states can have any number of transitions leading to or going from the state. One pair of states can have any number of transitions between the two states.

When there is more than one transition going from a state, the transitions are processed in a user-defined order, only one transition from a state will actually be followed. Once a transition condition is satisfied, all other transitions from the same state are not processed. If a transition condition is not satisfied the condition in the next transition is evaluated. If there are no other unprocessed transitions, then the instance remains in the state and the instance processing is not stopped. If, however, a transition condition is satisfied, the processing action blocks specified by the transition are applied to the target. Upon successful processing, the instance processing proceeds to the next state. If action processing was not successful, then an error is returned, and workflow instance processing stops.

Action blocks can initiate the querying of a targeted device. The actual processing of the query must then be performed by a DM terminal state that the transition leads to. Instance processing then stops at the DM terminal state until a response from the targeted device is returned. The response must then be evaluated by the condition(s) of one or more transitions going from the DM terminal state, in order to determine whether a condition (related to the device response) is satisfied.

A workflow contains process states and transitions that define the logic and the processing to be applied to targeted entities. A workflow instance is the processing of a workflow instantiation for a targeted wireless device at a specific time. When processing workflow instances the evaluation of logical conditions is influenced by the specific conditions encountered at the time of instance processing (e.g., time-specific factors). Different processing of the same workflow instance, targeting the same entity, but running at different times, can follow different logical paths and process the target differently.

Instance processing can be transferred between parent (caller) and subroutine (callee) workflows. Many users can instantiate and process separate workflow instances from the same workflow. Workflow instances operate independently of the associated workflow template and all other instances instantiated from the template. At any one time, each instance processes a different target, although, different instances can process the same target, at different times. If workflow instance processing is stopped at a persistent state, then instance processing can resume from the point of stoppage. If workflow instance processing is stopped when the processing is not at a persistent state, then instance processing cannot resume from the point of stoppage.

A workflow instance can exist in one of three operational states: running, completed, and aborted. In the running state, a targeted entity is being processed by the instance. In the completed state, the instance has reached an end state in the highest (or only) workflow in a stack, and instance processing is terminated. In the aborted state, instance processing has been terminated because an exception occurred (during processing of a transition condition or action), a device query time-out exception occurred, or a computer malfunction occurred.

Created workflows can be used in a wireless operator environment by the MDM carrier suite to manage wireless devices. Prior to using a workflow, a mapping must be established to assign a specific workflow to direct a particular type of management task. Workflow can be assigned to a management task by either implicit or explicit means. In the implicit case, the category to which a workflow is assigned at the time of creation controls the type of management task suitable for the workflow. When an MDM user initiates a specific task, the assigned workflow is instantiated and the instance is processed. Composite category workflows are not implicitly assigned to management tasks. In the explicit case, an MDM user assigns a specific workflow to the task to be performed, regardless of any implicit assignments. The user can select any workflow, including those of the composite workflow category.

To initiate device management, a user selects a management task, and the MDM carrier suite determines the workflow to direct the task based on the following factors: device identity, management task, and initiator (client or server). This is an example of implicit assignment. Different default workflows, to be used for each category of task, can be specified at the device profile, device model, and system levels. An explicit assignment permits a user to select a workflow other than the workflow implicitly assigned by the MDM carrier suite. Explicit workflow assignment is necessary in certain cases, such as testing an experimental device management algorithm, or using a composite workflow. In order to explicitly assign a workflow to direct a management task, an MDM advance request feature is used to select a workflow from a list of suitable workflows.

Workflows must be instantiated prior to commencing workflow instance processing that directs management support of a targeted entity. Workflows are only instantiated prior to initial instance processing, and not when instance processing is suspended (e.g., waiting for the response to a device query) or transferred between caller and callee workflows. Once workflow instance processing commences, instance processing can be observed using the Workflow monitor.

Workflows specify the processing of targeted entities, and specify the logic that controls that processing. However, in order to actually process a target, workflows must first be instantiated by a wireless operator device management system (e.g., the MDM carrier suite). Instance processing of a workflow then directs the wireless operator OTA system to actually perform the processing of the target.

Instance processing of all workflows follows the pattern of: initial state to transition to state to transition to state, and so on till the end state is reached. Instance processing evaluates the logical condition of each transition to determine whether the condition is satisfied. When a transition condition is satisfied, all action blocks specified by the transition are applied to the targeted entity in the specified order. When more than one transition goes from a process state, each transition is processed in a designer-specified order.

Instance processing adheres to specific guidelines dictating beginning a workflow, transition processing, state processing, and ending a workflow for each specific situation. For the beginning, after instantiation, instance processing of the top workflow in a stack always begins at the initial process state. If the initial state is a transient state, the first transition going from the state is processed. If the initial state is a subroutine state, then instance processing is immediately transferred to the called workflow. After instance processing is transferred to a called workflow, processing always begins at the initial state in the called workflow. If instance processing is resumed after being stopped at a persistent state, processing resumes from the point of stoppage.

For transition processing, the processing begins with the first (or only) transition going from a state. If more than one transition goes from a state, the transitions are processed in the order specified by the designer. If a transition's logical condition is satisfied then all processing specified by the transition is applied to the target. If a specified processing action is not successfully applied to the targeted entity, an error is returned, and instance processing stops. All other transitions between the same two states are not processed, and processing proceeds to the state that the processed transition leads to. If a transition's logical condition is not satisfied, the next transition between the two states is processed, and so on, until all transitions between the two states are processed. If none of the transitional conditions between two states are satisfied, then the instance remains in the prior state, but processing does not stop.

For state processing, when processing a DM terminal state, a query (specified by a transition before the state) is sent to the target device. Instance processing is suspended until the response is returned. After receipt of the response, the state processes the response (which is evaluated by a transition after the state to determine subsequent actions). When processing a subroutine state, instance processing is transferred to the called workflow. When instance processing reaches a transient state, the first transition going from the state is then processed.

During ending instance processing, when instance processing reaches an end state in a callee workflow in a stack, processing is transferred to the subroutine state in the caller workflow. When instance processing reaches an end state in the highest or only workflow in a stack, all instance processing is terminated.

In one embodiment, a workflow monitor is provided to enable a user to examine the workflow instance processing of a target entity for analysis and troubleshooting purposes. A graphical user interface window is provided to allow step-by-step observation of workflow instances. Processing messages (logs) are created during workflow instance processing. The state-by-state progress of workflow instance processing of workflows in the pending state can be tracked.

Workflows are managed by processing them through workflow states that comprise the workflow management life cycle. After a workflow has been created, the functional capability of the workflow is managed throughout its life cycle by the state that is applied to the workflow. Workflow states control which user can invoke workflow instance processing from a workflow, what entities can be targeted by workflow instances, and what life cycle states can subsequently be applied to a workflow.

Figure 6:
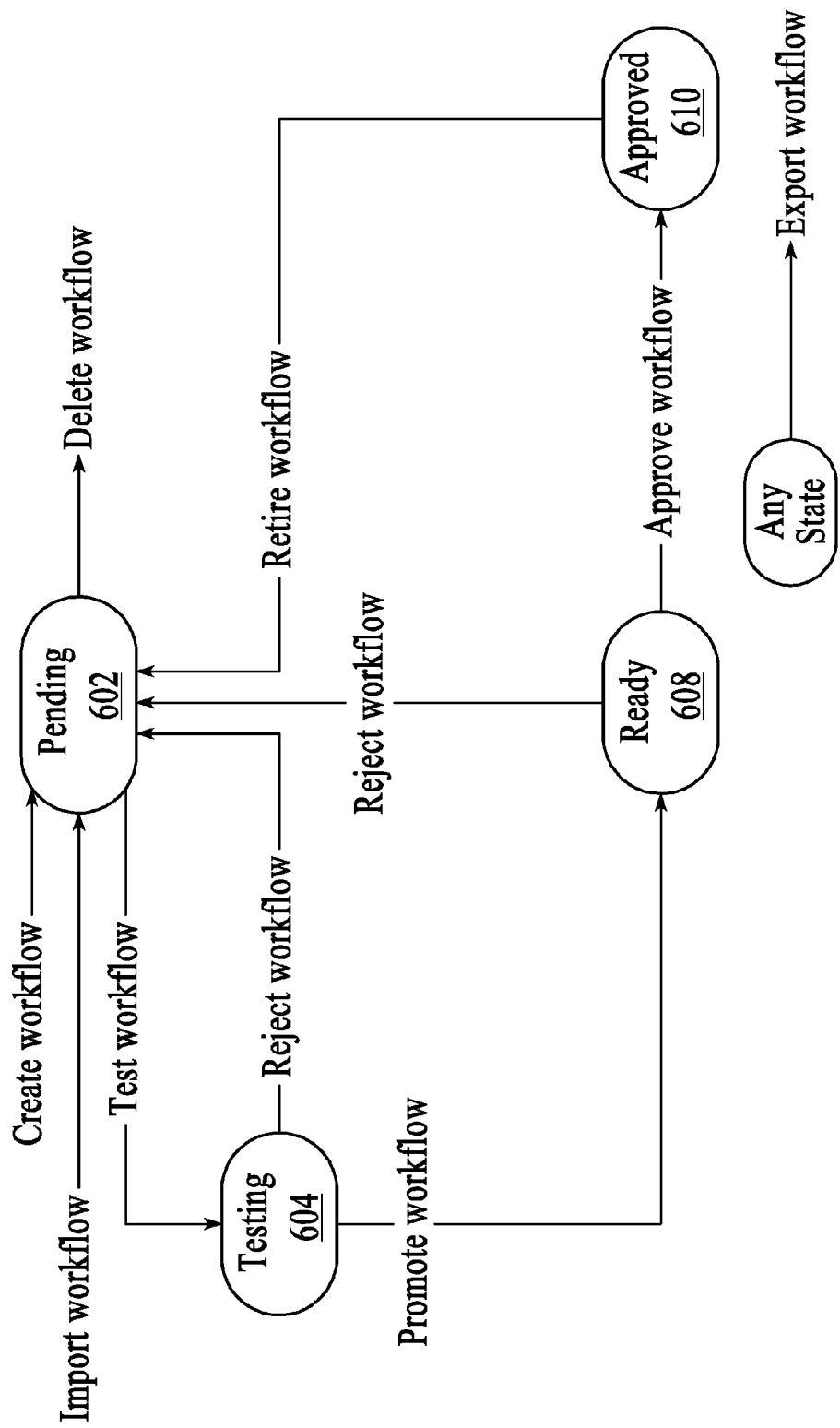
FIG. 6 is a flow diagram that illustrates workflow life cycle states, under an embodiment.

Each workflow exists in one of the following workflow states of pending, testing, ready, or approved. In the pending state, the workflow is in development and cannot be assigned to direct management tasks. Newly created and imported workflows are assigned pending status. Pending workflows can then modified, and can be assigned testing status and deleted status. In the testing state, the workflow can support the testing of target entities. Testing workflows operate as regular, approved workflows, and can be subjected to test cases to determine suitability for normal, operational target support. Testing workflows can be rejected (to pending status) or promoted (to ready status). In the ready status, the workflow can undergo administrative processing (approval or rejection). Ready status workflows can be rejected (to pending status) or approved (to support normal, operational targets). In the approved status, the workflow can direct management tasks in support of targeted entities. Approved status workflows can be retired (to pending status). FIG. 6 is a flow diagram that illustrates workflow life cycle states, under an embodiment. This figure shows the transition of workflow states among the different statuses of pending 602, testing 604, ready 608, and approved 610.

In general, workflows direct processes that manage targets such as a wireless device, an Operation Support System, a computer system, or a collection of these targets. Workflows specify the logic and processing to be performed on a target when a workflow is instantiated. Workflow designers define the logic and processing of a workflow by specifying the process state and transition components. The high-level logic of a workflow is graphically represented by the position of process states and the transitions between states. The low-level logic of a workflow is specified in each transition's logical condition. Processing is specified in the action blocks and the action sequence applied by each transition when the transition's condition is met. A workflow is a plan for managing targets. A system such as the MDM carrier suite, that is capable of actually processing targets, then uses the workflow plan to process targets. The system instantiates (starts up) a workflow instance to process each target, which is then manages target processing according to the logic specified by the workflow and the relevant factors related to the target and its environment.

Figure 7:
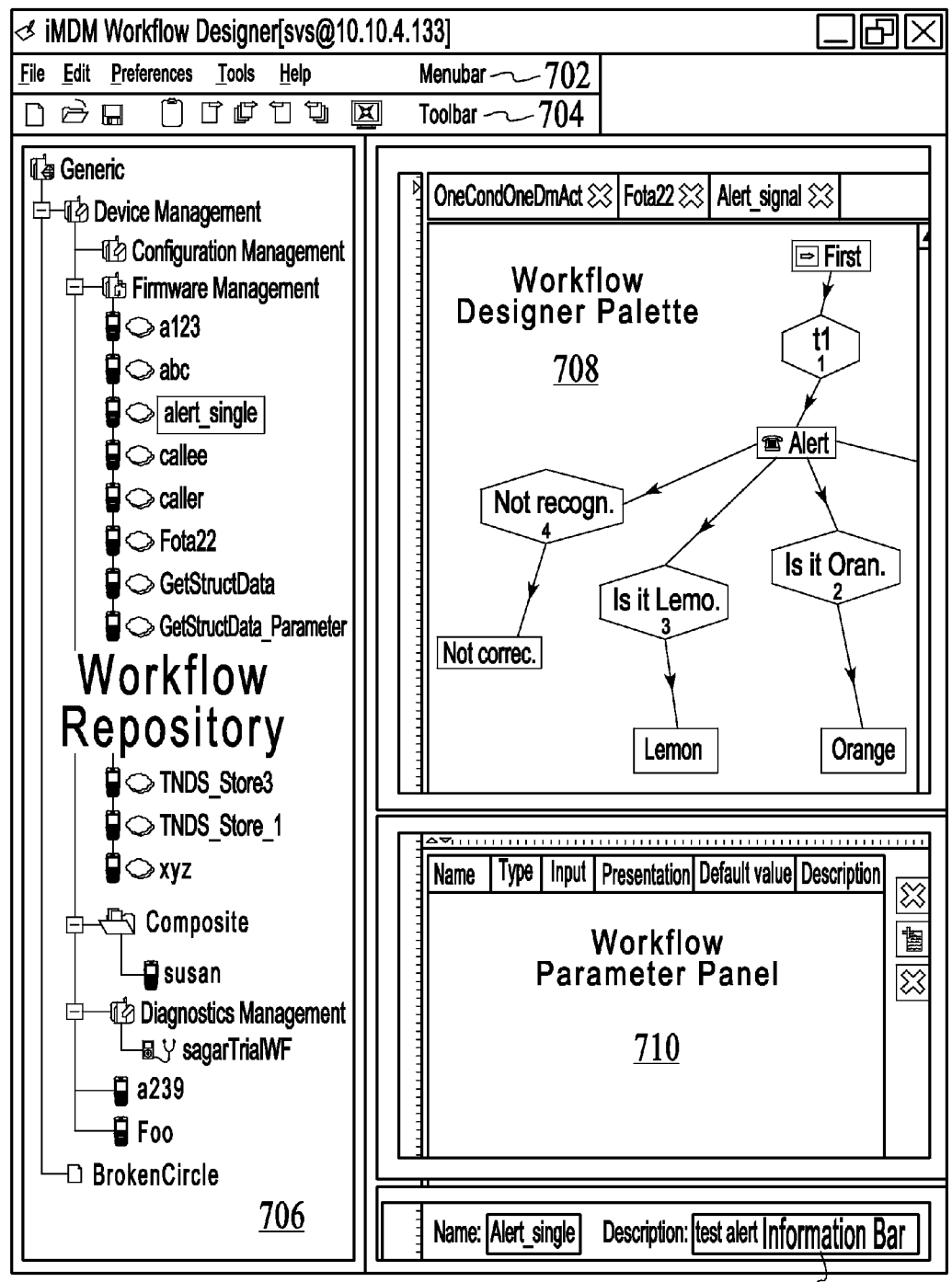
FIG. 7 illustrates a graphical user interface screen for designing a workflow, under an embodiment.

In one embodiment, the workflow designer application is provided as a GUI-based "free-form" application, in which the user invokes functionality based on the design of workflows, and not on the order of functional procedures. FIG. 7 illustrates a graphical user interface screen for designing a workflow, under an embodiment. The main application window of the workflow designer program enables designers to create, import, review, modify, export, and delete workflows. As shown in FIG. 7, the main window is divided into the following functional areas: a menubar 702 that provides access to application functionality; a toolbar 704 that provides quick access to commonly-used application functionality; a workflow repository 706 that lists workflows for review and management, grouped according to workflow categories; a workflow designer palette 708 that provides graphic display of the workflow process states and transitions; a workflow parameter panel 710 that lists external parameters for the displayed workflow; and an information bar 712 that provides the name and description of the displayed workflow.

As a graphical user interface system, it should be noted that any number of icon or object representations can be used for the states and transitions shown in FIG. 7. Icons can be of different shapes, colors, shading or hatch patterns to denote different types or statuses of the states and transitions, based on design rules and preferences. In one embodiment, the user interface includes a drag-and-drop utility that allows a designer to select icons or object elements from a menu area and drop them into the designer palette are 708. Using a combination of mouse and/or keyboard commands, these elements can then be manipulated using familiar computer-implemented drawing techniques to create a workflow.

Pluggable Workflow Framework

In one embodiment, the workflow design process described above is used by a mobile device management system to define management policies for implementation in mobile devices. The method utilizes a pluggable workflow framework to achieve mobile device management externalization. The mobile device management platform implements a set of basic action blocks that are used as primitives for further management policy composition. The method provides a development environment integrated with a mobile device management platform that allows assembling management (monitoring) primitives into meaningful management policies without changes to a core management platform infrastructure. The method allows new primitives to be deployed on the fly as add-on products to enable new and advanced management policies, best integration practices with a carrier operational support system.

The target mobile device is a managed entity representing an object that can be controlled by a standard protocol (e.g., SNMP, JMX, CIM, or OMA DM) or any proprietary management protocol. The management policy is presented as a workflow that is executed by a workflow engine, such as workflow engine 210 of FIG. 2. The engine controls an execution using different factors, such as polling intervals, external events, device traffic, and other environmental aspects. The workflow designer is used to manage workflow definitions. It is implemented as a highly customizable and metadata driven application, where each device management task type corresponds to a workflow category. Within a category, multiple workflow definitions can be created to get an advantage of one of few recommended policies or optimize user experience for a certain group of mobile devices.

Figure 8:
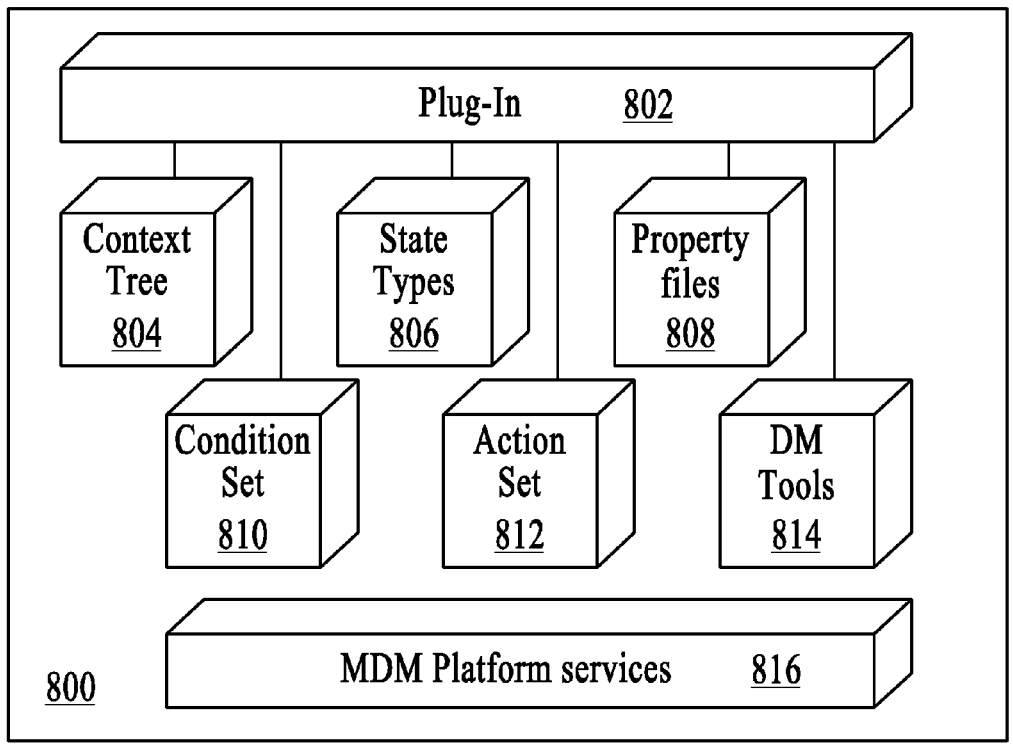
FIG. 8 is a block diagram that illustrates the components of an MDM plug-in module for workflow-based mobile device management tasks, under and embodiment.

In one embodiment, the workflow-based management tasks are implemented as an MDM plug-in module that comprises protocol and MDM specific action blocks. This structure, in conjunction with a base set of actions and conditions presents a rich repository to build simple and complex management applications. FIG. 8 is a block diagram that illustrates the components of an MDM plug-in module for workflow-based mobile device management tasks, under and embodiment. The plug-in module 802 is coupled to an aggregated workflow context tree 804 that contains categories and subcategories defined by the MDM plug-in. The MDM system 800 defines a set of mobile device management specific actions, stored in action set 812, and conditions, stored in condition set 810. It also defines mobile device management specific contexts (e.g., FOTA, RD, Composite, and configuration management). The state types module 806 stores state definition files that define a new mobile device specific state.

This suspends further workflow execution until a device responds to a previously sent OMA message. A DM tools module 814 comprises tools descriptors that define and MDM specific tools menu. The MDM property files 808 define localized key values. The MDM platform services 816 can include a platform services API and various platform service routines that couple the workflow engine to a host computer system or OS.

Figure 9:
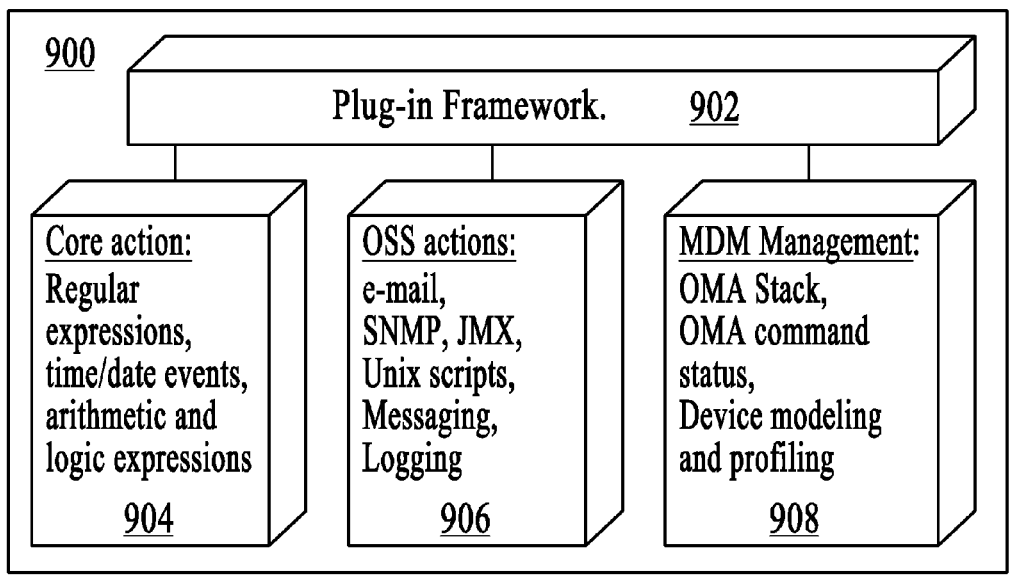
FIG. 9 is a block diagram that illustrates an action block repository for use with an MDM plug-in module, under an embodiment.

FIG. 9 is a block diagram that illustrates an action block repository for use with an MDM plug-in module, under an embodiment. As shown in system 900, a core action set 904 comprises action blocks (actions and conditions) to create and evaluate logical and arithmetical expressions, enable parameters, evaluate UNIX regular expressions, and perform text processing. For example, date and time conditions can be used to inspect a current time range against a range of specified legal timing intervals, day of the week and other conditions. An OSS action set 906 provides mechanisms for exporting data out of the MDM framework into a file system of a host OS. This module may enable SNMP (Simple Network Management Protocol) and JMX (Java Management Extensions) to get and set actions. It also launches program scripts, creates custom logging files, emits JMS (Java Message Service) notifications, sends e-mail, and other similar tasks. The MDM plug-in framework 902 provides and MDM specific action set. The main elements of this plug-in enable the construction of complex OMA messages and the transmission of these messages to managed resources, such as the mobile client devices. It can also evaluate overall incoming OMA message status, and statuses of individual commands. Some action blocks expose certain MDM data models, such as device, profile, subscriber, managed application, environmental conditions (e.g., "roaming"), group membership, and other similar models. An MDM management component 908 comprises various OMA data objects, such as the OMA stack, OMA command status, and device modeling and profiling, among others.

Figure 10:
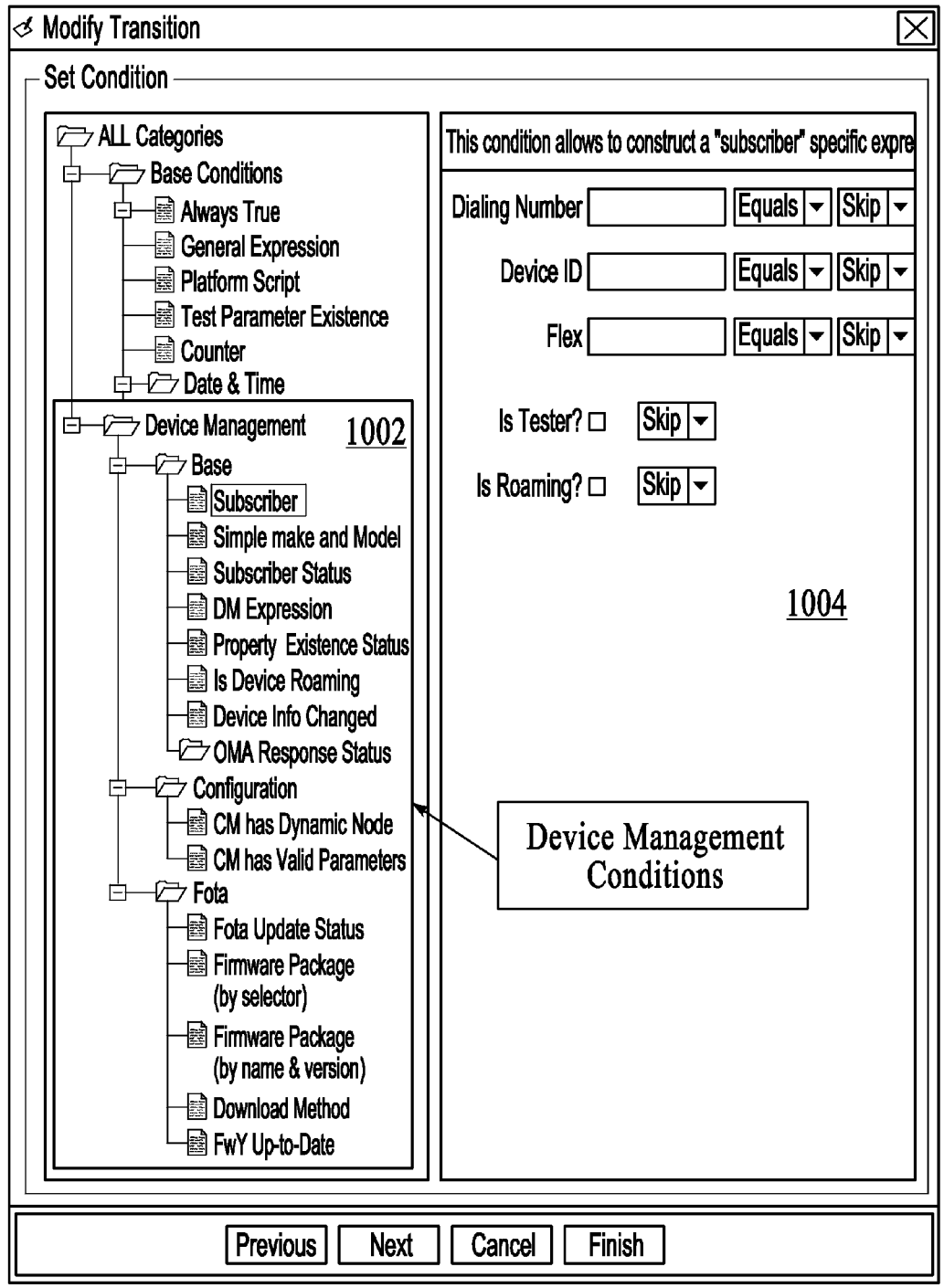
FIG. 10 is an example screenshot for the workflow GUI for defining device management conditions, under an embodiment.

As described above, the workflow designer application is provided as a GUI-based "free-form" application. The GUI is typically implemented through a number of different interactive screens that allow user input to define and control various parameters related to workflow design for the various management functions. FIG. 10 is an example screenshot for the workflow GUI for defining device management conditions, under an embodiment. A device management conditions pull-down menu window 1002 is provided within a "set conditions" display area of display screen 1000. This menu provides for the viewing and setting of various parameters related to base management functions, configuration functions, and firmware (FOTA) updates. An input screen 1004 that allows for user input is activated upon the selection of a corresponding management menu item. For the example of FIG. 10, selecting the "subscriber" table in window 1002 results in the display of window 1004 that allows the user to construct subscriber-specific expressions.

Figure 11:
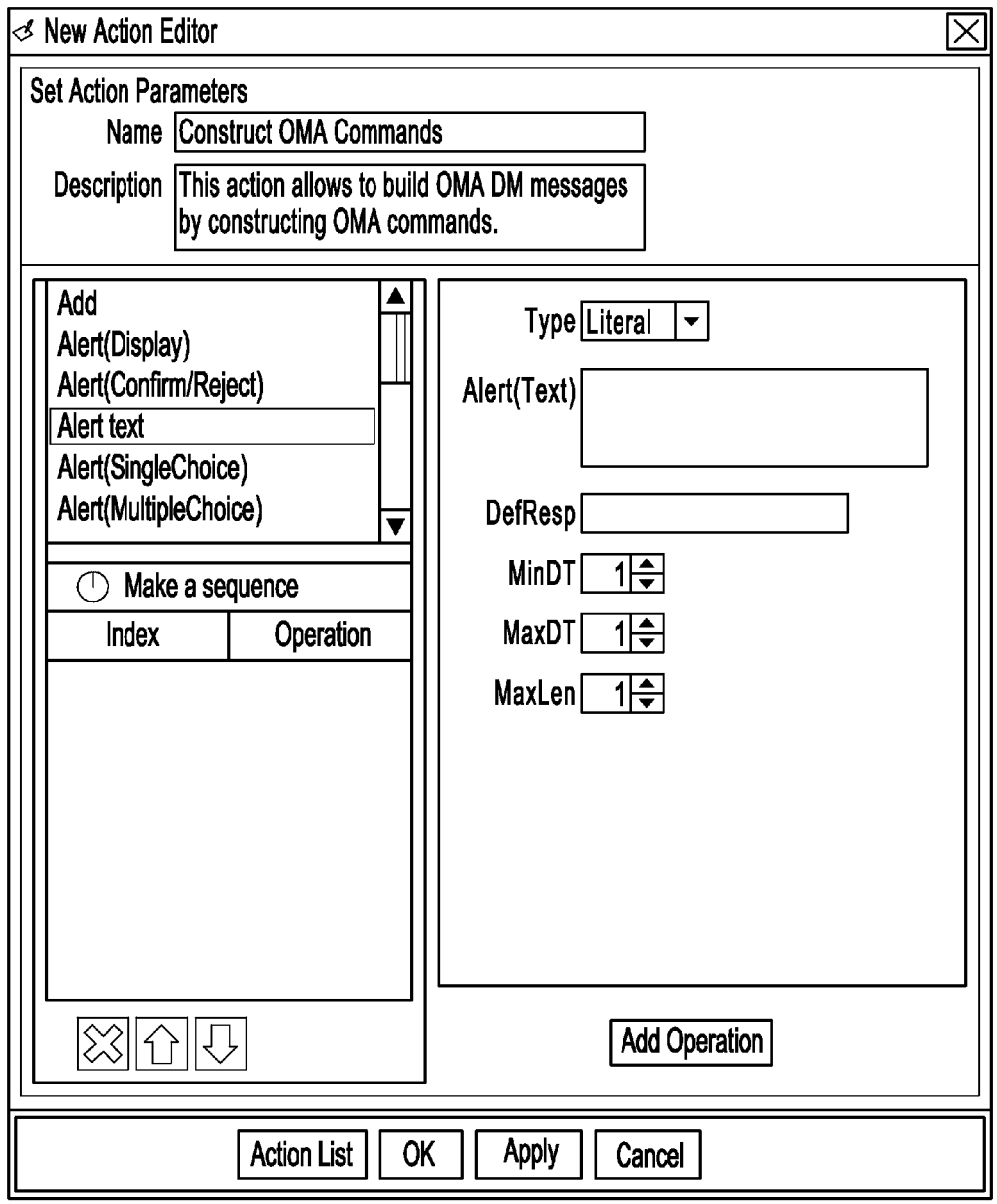
FIG. 11 is an example screenshot for the workflow GUI of a workflow designer OMA command editor, under an embodiment.

FIG. 11 is an example screenshot for the workflow GUI of a workflow designer OMA command editor, under an embodiment. The display window 1100 illustrated in FIG. 11 allows a user to set action parameters by specifying a name, description, and setting certain characteristics. The example illustrated in FIG. 11 shows the construction of OMA commands that allow the building of OMA DM messages.

The workflow framework described and illustrated herein allows device management algorithms to be designed and implemented in a drag-and-drop GUI paradigm, as illustrated in FIG. 7. This frees a carrier to modify or totally replace factory built solutions for supported mobile devices. It eliminates the need for core software changes for customization of management tasks. The workflow life cycle controls workflow changes. For approved management tasks, corresponding workflows are sealed to eliminate accidental workflow changes. Individual workflow instances can migrate within a cluster to improve scalability and eliminate any "same box" affinity requirement. A workflow definition is similar to a programming unit in that it introduces flexibility, parameterization, and defines few API layers. An internal management tasks is associated with a corresponding workflow definition. The association is flexible and follows a device make/model profile that is based on a three level inheritance paradigm. The lowest level is system-based, the medium-level is model based, and the highest-level (most fine-grained association) is at the profile level. Therefore, by issuing the same task, multiple workflows can be assigned to carry out an assignment.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A method of implementing mobile device management in a network of managed object mobile devices coupled to a mobile device manager server computer, comprising:
    defining a set of action blocks comprising actions and conditions to be implemented on a mobile device managed by the mobile device manager server;
    using the action blocks as primitives for the composition of management tasks;
    representing the action blocks as objects in a graphical user interface layout tool;
    defining the management tasks using a workflow design tool that utilizes a drag-and-drop graphical user interface, the management tasks comprising a plurality of process states functionally coupled to one another through one or more transitions, wherein at least one process state of the plurality of process states calls one or more other process states of the plurality of process states at least one of directly and through stacked process states of the plurality of process states, wherein a first workflow includes a first subroutine state and a first end state of the plurality of process states and a second workflow includes a second end state of the plurality of process states, the first workflow calling the second workflow through the first subroutine state, the second workflow returning control to the first workflow when the one or more transitions reach the second end state, the one or more transitions concluding when reaching the first end state;
    wherein the mobile device is an Open Mobile Alliance Device Management (OAM DM) enabled mobile device, and the process states include one or more configuration parameters of the mobile device; and
    wherein the one or more configuration parameters are represented in at least one node of an OMA DM management tree for the mobile device.

2. The method of claim 1 wherein a process state of the plurality of process states comprises one of a transient state, a terminal state, and a subroutine state, wherein the first subroutine state comprises the subroutine state.

3. The method of claim 2 wherein a process state is assigned an attribute selected from the group consisting of: initial state, persistent state, and end state.

4. The method of claim 3 wherein a process state is assigned a severity level selected from the group consisting of: normal, warning, minor, major, critical, and fatal.

5. The method of claim 1 wherein the one or more transitions comprise at least one transition path linking a first process state to a second process state.

6. The method of claim 5 wherein the transition comprises a logical condition and one or more processing blocks.

7. The method of claim 6 further comprising:
    processing a transition by analyzing the logical condition to determine whether or not the condition is satisfied, applying the corresponding action block to the mobile device if the condition is satisfied; and
    generating an error message if the condition is not satisfied.

8. The method of claim 1 wherein the workflow design tool is used to create a workflow that directs a management support of the mobile device, wherein the workflow comprises the first workflow and the second work flow.

9. The method of claim 8 further comprising instantiating the workflow by the server computer to direct a carrier system administrator to perform processing of the mobile device.

10. The method of claim 9 wherein the processing comprises transmitting firmware over the air to the mobile device.

11. The method of claim 10 wherein the processing adheres to a sequence of processing states and transitions defined by the workflow.

12. The method of claim 11 wherein the workflow transitions through a workflow lifecycle comprising a pending state, a testing state, a ready state, and an approved state.

13. A system for configuring and managing a mobile device remotely coupled to a device management (DM) server comprising:
    one or more processors executing at least one application for providing, a configuration manager component configuring a number of parameters of the mobile device to be operable with one or more functional applications;
    a firmware manager component to upgrade the mobile device using an over-the-air protocol to transmit firmware upgrade modules;
    a diagnostics manager component to remotely query, diagnose and fix problems on the mobile device;
    a workflow designer component enabling a user to design and implement a set of instructions that dictate how the DM server institutes over-the-air device management operations to the mobile device, in the form of a workflow comprising a first workflow and a second workflow, wherein the set of instructions includes a plurality of process states functionally coupled to one another through one or more transitions, wherein at least one process state of the plurality of process states calls one or more other process states of the plurality of process states at least one of directly and through stacked process states of the plurality of process states, wherein a first workflow includes a first subroutine state and a first end state of the plurality of process states and a second workflow includes a second end state of the plurality of process states, the first workflow calling the second workflow through the first subroutine state, the second workflow returning control to the first workflow when the one or more transitions reach the second end state, the one or more transitions concluding when reaching the first end state;
    wherein the mobile device is an Open Mobile Alliance Device Management (OAM DM) enabled mobile device, and the process states include one or more configuration parameters of the mobile device; and wherein the one or more configuration parameters are represented in at least one node of an OMA DM management tree for the mobile device.

14. The system of claim 13 further comprising a configuration database stored in a data store coupled to the DM server, and storing a configuration library containing a plurality of data objects related to configuration and operation of the mobile device.

15. The system of claim 14 wherein the mobile device is an Open Mobile Alliance Device Management (OMA DM) enabled mobile device, and wherein the firmware upgrade modules are transmitted over an OMA DM based firmware-over-the-air protocol.

16. The system of claim 15 wherein the configuration settings of the mobile device are embodied in an OMA DM device management tree of the mobile device, and wherein a virtual configuration property is associated with a device property defined with one or more device description framework files.

17. The system of claim 16 wherein the mobile device comprises a smartphone coupled to the DM server over at least one wireless network.

18. The system of claim 17 wherein the workflow designer component is used to create a workflow that directs firmware management of the mobile device.

19. A user interface system comprising:
one or more processors executing at least one application for providing, a menu area providing icons representing a plurality of process states and one or more transitions;
a drag-and-drop tool allowing a user to create a workflow including a first workflow and a second workflow and comprising the plurality of process states linked by the one or more transitions, wherein at least one process state of the plurality of process states calls at least one other process state of the plurality of process states at least one of directly and through stacked process states of the plurality of process states, wherein the first workflow includes a first subroutine state and a first end state of the plurality of process states and the second workflow includes a second end state of the plurality of process states, the first workflow calling the second workflow through the first subroutine state, the second workflow returning control to the first workflow when the one or more transitions reach the second end state, the one or more transitions concluding when reaching the first end state;
a workflow palette area displaying completed and in-process workflows, wherein a workflow dictates a process flow for managing remote support of a managed object client device coupled to a server computer over a network, and wherein the remote support comprises installing one or more firmware updates that are transmitted to the device using an over-the-air protocol;
wherein the mobile device is an Open Mobile Alliance Device Management (OAM DM) enabled mobile device, and the process states include one or more configuration parameters of the mobile device; and
wherein the one or more configuration parameters are represented in at least one node of an OMA DM management tree for the mobile device.

20. The user interface system of claim 19 further comprising an update component configured to enable transmission of the firmware update to the mobile device over an OMA DM based firmware-over-the-air protocol.

* * * * *